No. 821,446. PATENTED MAY 22, 1906.
J. N. WIGGS.
CLEANER FOR COTTON GIN SAWS.
APPLICATION FILED MAY 20, 1905.
2 SHEETS—SHEET 2.
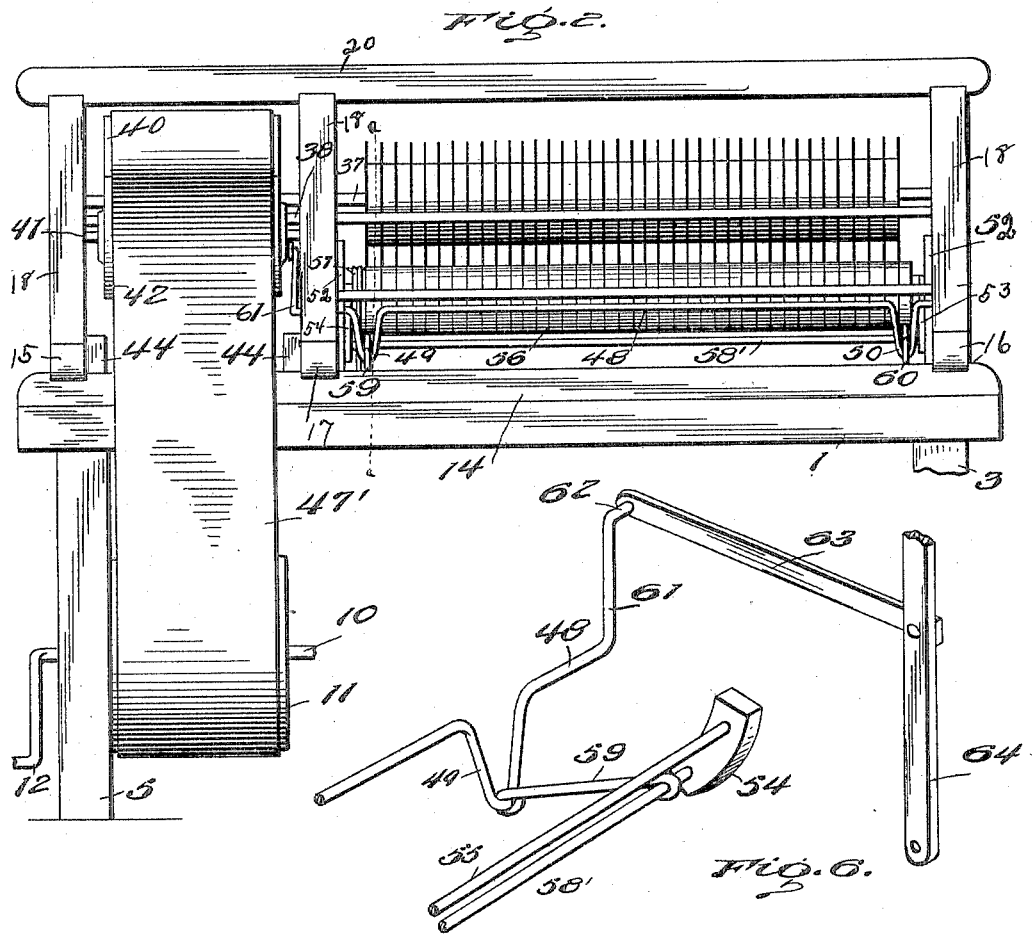
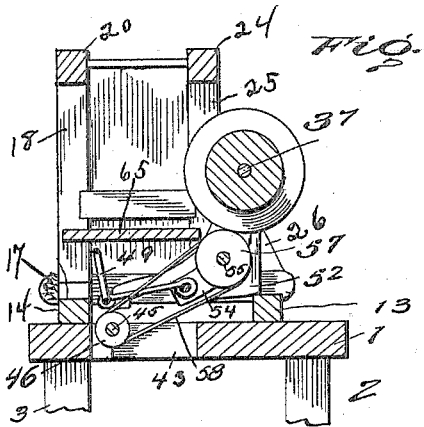
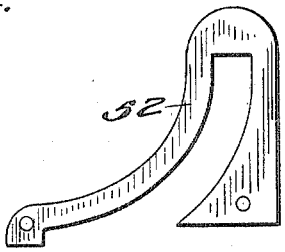
Inventor
J. N. Wiggs
Witnesses
G. R. Thomas
E. M. Oxford

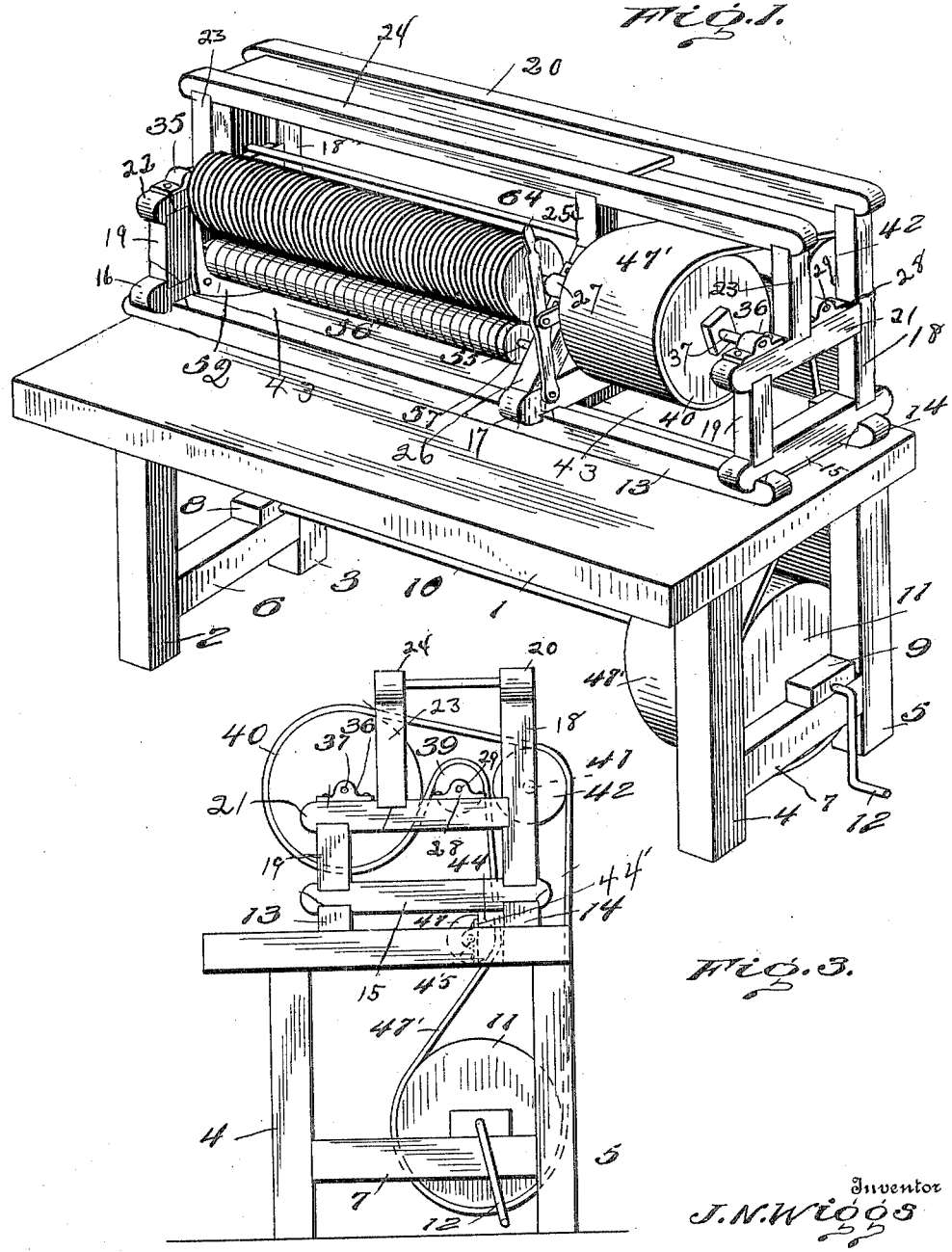

UNITED STATES PATENT OFFICE.

JONATHAN N. WIGGS, OF SENATH, MISSOURI, ASSIGNOR OF ONE-HALF TO JOHN H. BRADLEY, OF SENATH, MISSOURI.

CLEANER FOR COTTON-GIN SAWS.

No. 821,446.　　　　Specification of Letters Patent.　　　　Patented May 22, 1906.

Application filed May 20, 1905. Serial No. 261,359.

*To all whom it may concern:*

Be it known that I, JONATHAN N. WIGGS, a citizen of the United States, residing at Senath, in the county of Dunklin, State of Missouri, have invented certain new and useful Improvements in Cleaners for Cotton-Gin Saws; and I do hereby declare the following to be a full, clear, and exact description of the invention, such as will enable others skilled in the art to which it appertains to make and use the same.

This invention relates to cotton-gin machinery.

One object of the invention is to provide mechanism whereby cleaning of the gin-saws by hand is obviated.

Another object of the invention resides in the provision of mechanism whereby the saws may be cleaned without stopping the machinery.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the appended claims without departing from the spirit or sacrificing any of the advantages of the present invention.

In the drawings, Figure 1 is a perspective view of my invention, parts being broken away to illustrate the interior mechanism. Fig. 2 is a rear elevation. Fig. 3 is a side elevation. Fig. 4 is a transverse sectional view on the line *a a* of Fig. 2. Fig. 5 is a detail view of one of the saw-cleaning guides. Fig. 6 is a detail view including guide-blocks, the shaft upon which they are mounted, the crank-shaft in the rear thereof, and the connections between the said shafts, also illustrating the lever connected with the crank-shaft.

Referring now more particularly to the accompanying drawings, there is shown a platform 1, mounted upon suitable legs 2, 3, 4, and 5, there being cross-pieces 6 and 7 connecting the corresponding legs or posts at the ends of the platform, the upper faces of the cross-pieces 6 and 7 each having a block 8 and 9, respectively, provided with a perforation for the reception of the longitudinal drive-shaft 10, which latter has a drive-pulley 11 fixedly secured thereupon, the drive-pulley being slightly spaced from the crank portion 12 of the shaft 10. It will be understood that the blocks 8 and 9 form journal-boxes for the rotating drive-shaft 10.

Mounted upon the upper face of the table are two longitudinal strips 13 and 14, supporting one of the transverse beams 15 and 16 at each of their corresponding ends and the transverse beam 17 intermediate and near one of their ends. On the said transverse beams are mounted the posts 18 and 19, the posts 18 being on the rear ends of the transverse beams and supporting the longitudinal beam 20, and the posts 19 being on the forward ends of the transverse beams and supporting the forward ends of the transverse beams 21 and 22, which support the posts 23. The rear ends of the beams 21 22 are supported by the posts 18. The posts 23 carry the longitudinal beam 24. Mounted upon the transverse beam 17 and supporting the beam 24 is the post 25, having a brace 26 between it and the end of the transverse beam 17.

Mounted upon the upper faces of the transverse beams 21 and 22 are alining bearing-boxes 35 and 36, the bearing-boxes 35 and 36 receiving the longitudinal saw-shaft 37, there being another journal-box 27 secured upon the brace 26, through which the said saw-shaft is passed for rotation. Mounted in the bearing-box 28 for longitudinal and parallel relation with respect to the saw-shaft 37 is another shaft 29, carrying a sheave or pulley 39 at one end thereof, the pulley 39 being arranged in direct alinement with a pulley 40, arranged at one end of the saw-shaft 37. Mounted upon a short shaft 41 between the uprights 18 is another pulley 42 of larger size than the intermediate pulley 39 and of smaller size than the pulley 40 upon the saw-shaft 37.

The table 1 is provided with an opening 43, through which projects downwardly hangers 44, secured to the inner faces of the lower transverse beams 15 and 17 and provided with brackets or the like 44' for the reception of a short shaft 45, arranged within the aforesaid opening 43, with one of its ends projecting beyond one of the brackets and provided with a sheave 46, there being a pulley-wheel 47 upon the said shaft intermediate the said brackets. Connecting the drive-pulley 11 of the drive-shaft 10 is a belt 47', which passes over the pulleys 40 and 42 and then downwardly and upwardly over the intermediate pulley 39, and downwardly in the rear of the pulley 47, the belt passing entirely around the aforesaid drive-pulley.

Journaled in two of the rear posts 18 is a crank-shaft 48, having bends 49 and 50. Disposed upon the inner sides of the transverse beam 16 and the post 19 and upon the adjacent sides of the transverse beam 17, beam 26, and the post 25 are curved guides 52 for the reception of journal-blocks 53 and 54 of the saw-cleaner shaft 55, which carries leather, rubber, or other disks 56, arranged closely together, there being a grooved pulley-wheel 57 at one end of the saw-cleaner shaft adjacent the corresponding end disk and the corresponding bearing-block 54. This pulley-wheel 57 is fixedly secured upon the saw-cleaner shaft and has a belt 58 working therein and connecting the grooved pulley 46 upon the projecting end of the aforesaid shaft 45, arranged within the opening 43 of the table.

Connecting the traveling blocks 53 and 54 at their rear ends is a transverse rod 58', secured to which are rearwardly-directed links 59 and 60, which connect to the respective bends 49 and 50 of the crank-shaft 48. It will be seen that the crank-shaft 48 extends through and beyond one of the intermediate rear posts, where it is bent forwardly, as at 61, and then laterally, as at 62, there being a link 63 connected at one of its ends to the said lateral portion 62 of the crank-shaft and intermediate the ends of the lever 64, whose inner end is pivotally mounted upon one face of the intermediate lower transverse cross-beam 17.

From the foregoing it will be seen that when the drive-shaft 10 is driven its drive-pulley also is driven, causing the belt connecting therewith to drive the corresponding pulleys mounted as stated above and in the frame, the saws being thereby revolved at a predetermined rate of speed and by reason of the belt contacting with the pulley 47 causing the grooved pulley 46 to rotate, and by reason of the belt connection between the latter and the grooved pulley 57 of the cleaner-shaft the latter is caused to rotate—that is, when the latter is thrown upwardly for engagement between the saws. However, by reason of the lever 64 and its peculiar connections with the crank-shaft 48 the cleaning-disks may be thrown downwardly in the curved guides 52 out of contact with the saws. This lever 64 is arranged in such manner with respect to the other elements of the machinery as not to interfere with the latter in either of its positions or in its movement. Therefore while the machinery is in operation and the saws are being revolved through the instrumentality of the driving-shaft and its belt and pulley-wheel connections aforesaid a lift upon the lever 64 will cause the cleaning-disks to be drawn forwardly toward the forward end of the said guides 51 and 52 and into engagement between the saws, the forward movement of the cleaning-disks causing the belt between the pulley 57 of the cleaning-disk shaft and the pulley 46 in the shaft of the opening 43 to tighten, resulting in a rapid rotation of the cleaner-disks with respect to the rotation of the saws, thereby cleaning them and obviating the usual cleaning of the gin-saws by hand. Now in order to throw the cleaner-shaft and its disks out of engagement with the gin-saws it is only necessary to force the lever 64 downwardly.

It will be noted that there is a shelf 65 arranged between the aforesaid posts and beneath the level of the gin-saws and above the level of the cleaning-disks when the latter are thrown out of engagement with the saws, and which is arranged in alinement with the cleaner-disks when the latter are thrown into operation with the saws for the reception of the cleanings, from which the latter may be readily removed from the rear of the machine.

It will be observed that the cleaning-disks of the cleaner-shaft are arranged closely together and are designed to fit between and against adjacent faces of the saws, and experience has shown that clogging of the parts of the machinery is obviated.

What is claimed is—

1. In gin-saw machinery, a table having a rotatable saw-shaft mounted thereabove, the said shaft carrying saws, a shelf disposed below the level of the said saw-shaft, curved guides mounted above the upper face of the table and extending from beneath the said saw-shaft, saw-cleaning disks, a shaft, for carrying the said disks, having its ends mounted for sliding movement in the said guides and adapted to support the said disks in alinement with and adjacent to the shelf when the said disks are thrown into operation with the said saws, means for rotating the saw-shaft and the cleaner-shaft, and means for sliding the cleaner-shaft in the aforesaid guides into and out of engagement with the saws during the operation of the machine.

2. In gin-saw machinery, a table, a saw-shaft mounted thereabove, oppositely-disposed guides arranged beneath the saw-shaft, the latter carrying saws, a cleaner-shaft mounted for rotation and sliding movement in the said guides, the cleaner-shaft carrying cleaning-disks, a crank-shaft arranged in the rear of the aforesaid shafts, connections between the cleaner-shaft and the crank-shaft, means for rotating the saw and cleaner shafts simultaneously, and connections between the cleaner-shaft and the crank-shaft whereby the latter may be moved in its guides into and out of contact with the saws of the saw-shaft during operation of the machine.

In testimony whereof I affix my signature in presence of two witnesses.

JONATHAN N. WIGGS.

Witnesses:
   T. C. McHaney,
   A. S. Milam.